(12) United States Patent
Kim et al.

(10) Patent No.: US 8,988,464 B2
(45) Date of Patent: Mar. 24, 2015

(54) SYSTEM AND METHOD FOR MULTI-LAYERED AUGMENTED REALITY

(75) Inventors: Kyung Hwan Kim, Yongin-si (KR); Yong Beom Lee, Seoul (KR); Sang Wook Kim, Seoul (KR); Seon Min Rhee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 629 days.

(21) Appl. No.: 13/226,946

(22) Filed: Sep. 7, 2011

(65) Prior Publication Data

US 2012/0146998 A1    Jun. 14, 2012

(30) Foreign Application Priority Data

Dec. 14, 2010 (KR) .................. 10-2010-0127473

(51) Int. Cl.
*G09G 5/00* (2006.01)
*G06T 19/00* (2011.01)
*G06T 7/00* (2006.01)
*G06T 7/20* (2006.01)

(52) U.S. Cl.
CPC ............. *G06T 19/006* (2013.01); *G06T 7/0083* (2013.01); *G06T 7/204* (2013.01); *G06T 2207/20144* (2013.01)
USPC ........................................................ 345/633

(58) Field of Classification Search
None
See application file for complete search history.

(56) References Cited

U.S. PATENT DOCUMENTS

| | | | |
|---|---|---|---|
| 6,760,026 B2 | 7/2004 | Li et al. | |
| 6,912,293 B1* | 6/2005 | Korobkin | 382/100 |
| 7,301,547 B2* | 11/2007 | Martins et al. | 345/633 |
| 7,391,424 B2* | 6/2008 | Lonsing | 345/633 |
| 7,991,220 B2* | 8/2011 | Nagai et al. | 382/154 |
| 8,040,361 B2* | 10/2011 | Bachelder et al. | 345/633 |
| 8,055,061 B2* | 11/2011 | Katano | 382/154 |
| 8,073,203 B2* | 12/2011 | Tang et al. | 382/107 |
| 8,675,016 B2* | 3/2014 | Vetterli et al. | 345/632 |
| 2005/0093889 A1* | 5/2005 | Sauer et al. | 345/633 |
| 2011/0096093 A1* | 4/2011 | Ol et al. | 345/633 |
| 2011/0254861 A1* | 10/2011 | Emura et al. | 345/633 |
| 2012/0007852 A1* | 1/2012 | Morate et al. | 345/419 |
| 2012/0069051 A1* | 3/2012 | Hagbi et al. | 345/633 |

FOREIGN PATENT DOCUMENTS

| | | |
|---|---|---|
| JP | 2005-339127 | 12/2005 |
| KR | 10-1999-0042072 | 6/1999 |
| KR | 10-2006-0021001 | 3/2006 |
| KR | 10-2008-0085655 | 9/2008 |
| KR | 10-2009-0000777 | 1/2009 |
| KR | 10-2010-0090401 | 8/2010 |

* cited by examiner

*Primary Examiner* — Ryan R Yang
(74) *Attorney, Agent, or Firm* — NSIP Law

(57) ABSTRACT

A multi-layered augmented reality system and method may extract a target object and a background from an image frame, may track the target object and the background, may apply different coordinate systems to a first virtual object corresponding to the target object and a second virtual object corresponding to the background, and may independently control the first virtual object and the second virtual object.

23 Claims, 9 Drawing Sheets

SYSTEM AND METHOD FOR MULTI-LAYERED AUGMENTED REALITY

CROSS-REFERENCE TO RELATED APPLICATIONS

This application claims the priority benefit of Korean Patent Application No. 10-2010-0127473, filed on Dec. 14, 2010, in the Korean Intellectual Property Office, the disclosure of which is incorporated herein by reference.

BACKGROUND

1. Field

Example embodiments of the following description relate to a multi-layered augmented reality system and method, and more particularly, to a multi-layered augmented reality system and method for independently controlling a virtual object corresponding to a target object and a virtual object corresponding to a background in an image frame by applying different coordinate systems to the virtual objects.

2. Description of the Related Art

Augmented reality technology provides special effects by expressing a predetermined object together with a virtual object corresponding to the predetermined object. By augmented reality technology, manufacturing costs may be reduced, and a physically inexpressible world may be expressed. Accordingly, augmented reality technology enables users to experience digital information that is personalized and has realistic-sensitivity.

A conventional augmented reality technology augments a virtual object of an object appearing on a single screen. The conventional augmented reality technology has a problem that virtual objects inevitably move in a single coordinate system, since virtual objects are augmented based on a coordinate system related to an object. Additionally, the conventional augmented reality technology has another problem that virtual objects disappear when a feature point as a base for augmenting virtual objects is covered due to an occlusion.

Accordingly, there is a desire to augment virtual objects for each of various objects on a screen, and to prevent a virtual object from disappearing even when an occlusion occurs.

SUMMARY

The foregoing and/or other aspects are achieved by providing a multi-layered augmented reality system including an extracting unit to extract a target object and a background from an image frame, a tracking unit to track the extracted target object and the extracted background, an augmenting unit to augment a virtual object corresponding to each of the tracked target object and the tracked background, and a display unit to display the augmented virtual object.

The foregoing and/or other aspects are achieved by providing a multi-layered augmented reality method including extracting a target object and a background from an image frame, tracking the extracted target object and the extracted background, augmenting a virtual object corresponding to each of the tracked target object and the tracked background, and displaying the augmented virtual object.

The foregoing and/or other aspects are also achieved by providing a multi-layered augmented reality method including extracting a target object and a background from an image frame, tracking the extracted target object and the extracted background, applying different coordinate systems to a first virtual object corresponding to the target object, and a second virtual object corresponding to the background, and drawing the first virtual object based on the target object, and drawing the second virtual object based on the background.

Additional aspects, features, and/or advantages of example embodiments will be set forth in part in the description which follows and, in part, will be apparent from the description, or may be learned by practice of the disclosure.

According to example embodiments, a target object and a background that are to be tracked may be separated into different layers, so that virtual objects may independently move based on coordinate systems of the target object and the background, thereby providing a more elaborate augmented reality.

Additionally, according to example embodiments, it is possible to solve a problem of disappearance of a virtual object due to an occlusion, by expressing a target object above a background, based on different coordinate systems.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
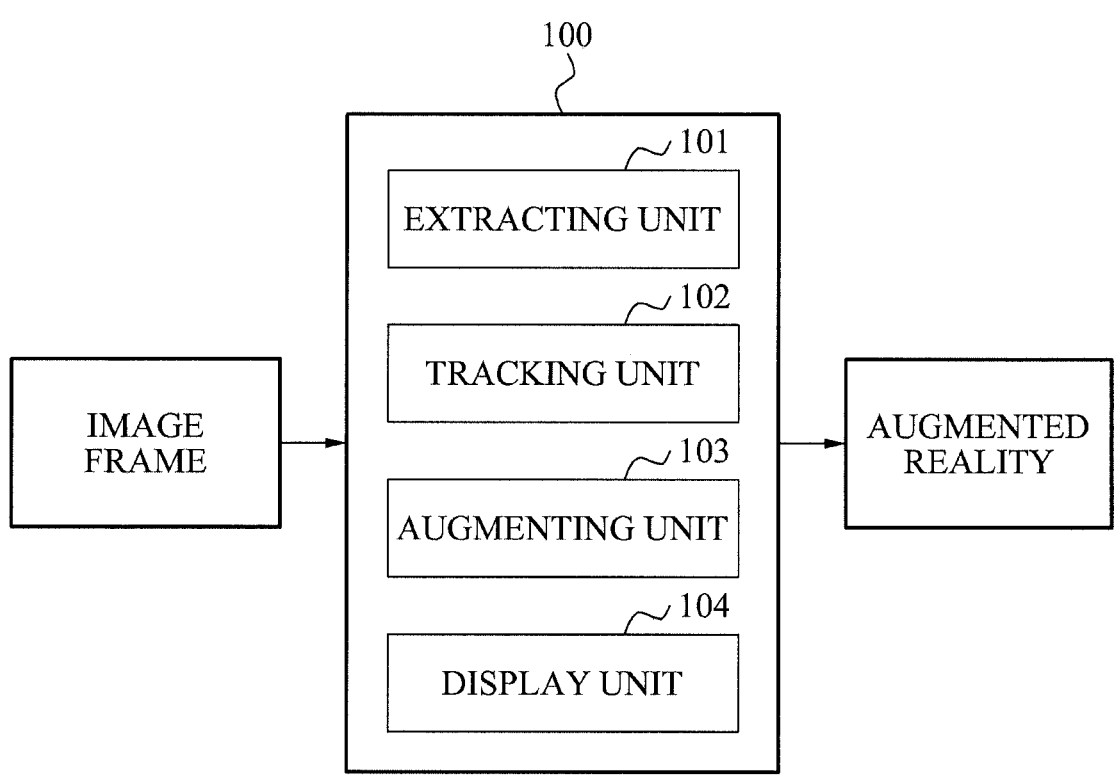
FIG. 1 illustrates a block diagram of a multi-layered augmented reality system 100 according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a multi-layered augmented reality system 100 according to example embodiments. The multi-layered augmented reality system 100 of FIG. 1 may be implemented by one or more processors, computers, and/or computer systems. The computers and/or computer systems may include input devices, such as one or more cameras, and output devices, such as one or more displays.

Referring to FIG. 1, the multi-layered augmented reality system 100 may include an extracting unit 101, a tracking unit 102, an augmenting unit 103, and a display unit 104.

The extracting unit 101 may extract a target object and a background from an image frame. That is, the extracting unit 101 may separate layers of the target and background in the image frame.

The tracking unit 102 may track the extracted target object and the extracted background.

The augmenting unit 103 may augment a virtual object corresponding to each of the tracked target object and the tracked background. Here, the augmenting unit 103 may augment a virtual object corresponding to the target object, in a front portion of the target object. Additionally, the augmenting unit 103 may augment a virtual object corresponding to the background in a rear portion of the target object. Accordingly, the augmenting unit 103 may augment the target object, prior to the background.

The display unit 104 may display the augmented virtual object on a display device.

Thus, in the multi-layered augmented reality system 100, the virtual object corresponding to the target object, and the virtual object corresponding to the background may independently move on a single screen, since the virtual objects have different coordinate systems. Accordingly, the target object and the virtual object may more easily interact with each other.

Additionally, in multi-layered augmented reality system 100, the virtual object corresponding to the target object may be augmented in the front portion of the target object, and the virtual object corresponding to the background may be augmented in the rear portion of the target object, and accordingly it is possible to solve an occlusion problem occurring between the virtual objects.

Figure 2:
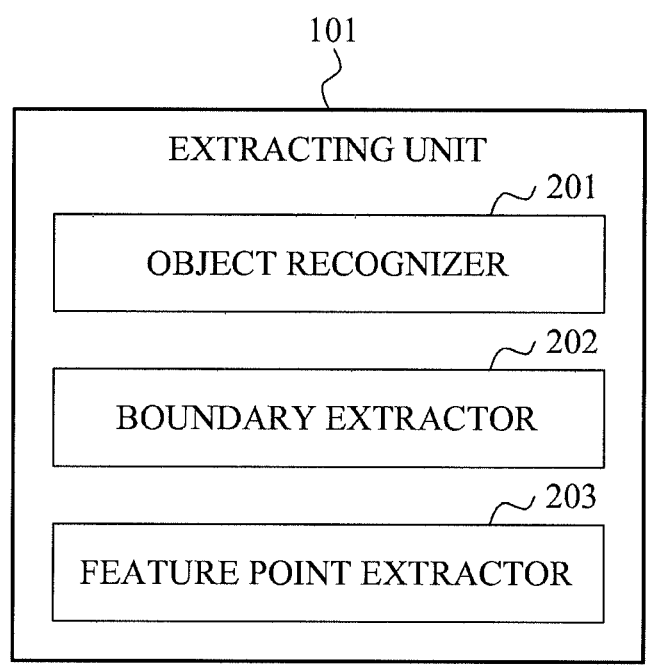
FIG. 2 illustrates a block diagram of an extracting unit of FIG. 1.

FIG. 2 illustrates a block diagram of the extracting unit 101 of FIG. 1.

Referring to FIG. 2, the extracting unit 101 may include an object recognizer 201, a boundary extractor 202, and a feature point extractor 203.

The object recognizer 201 may recognize the target object in consecutively input image frames. For example, the object recognizer 201 may more quickly recognize a target object using a two-dimensional (2D) image.

The boundary extractor 202 may extract a boundary of the recognized target object.

The feature point extractor 203 may extract a feature point from a region of the image frame obtained by excluding the extracted boundary of the target object.

Figure 3:
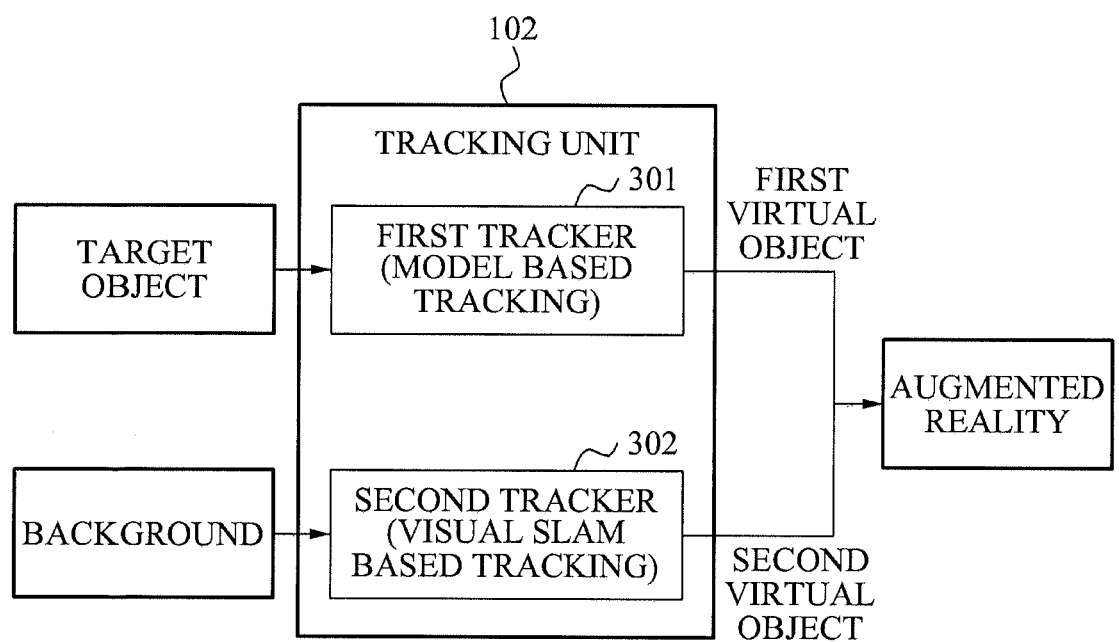
FIG. 3 illustrates a block diagram of a tracking unit of FIG. 1.

FIG. 3 illustrates a block diagram of the tracking unit 102 of FIG. 1.

Referring to FIG. 3, the tracking unit 102 may include a first tracker 301, and a second tracker 302.

The first tracker 301 may track a first virtual object corresponding to the target object. Additionally, the second tracker 302 may track a second virtual object corresponding to the background. That is, the tracking unit 102 may independently track the first virtual object and the second virtual object, for example, by applying different coordinate systems to the first virtual object and the second virtual object.

In the example shown in FIG. 3, the first tracker 301 includes model based tracking and the second tracker 302 includes visual SLAM based tracking, for example.

Figure 4:
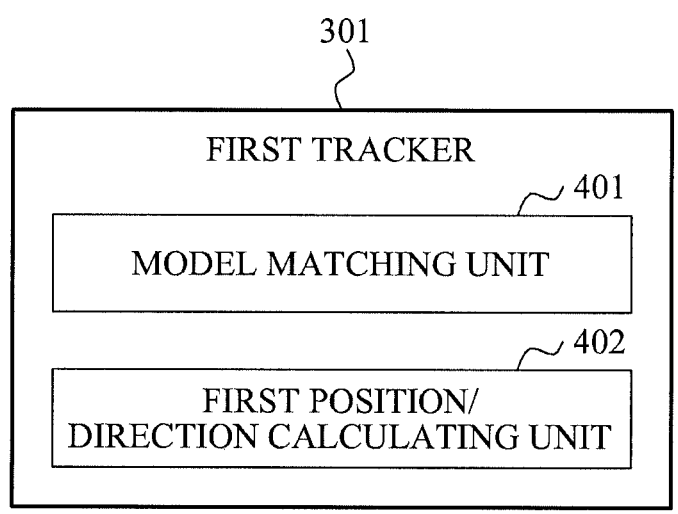
FIG. 4 illustrates a block diagram of a first tracker of FIG. 3.

FIG. 4 illustrates a block diagram of the first tracker 301 of FIG. 3.

Referring to FIG. 4, the first tracker 301 may include a model matching unit 401, and a first position/direction calculating unit 402.

The model matching unit 401 may match the extracted target object to a three-dimensional (3D) model stored in a database. Specifically, the model matching unit 401 may search for a 3D model corresponding to the target object from the database, and may match the found 3D model to the target object.

The first position/direction calculating unit 402 may calculate a position and a direction of the first virtual object that corresponds to the 3D model matched to the target object. Specifically, the first position/direction calculating unit 402 may calculate a position and a direction of a camera associated with the first virtual object, and may calculate the position and the direction of the first virtual object.

Figure 5:
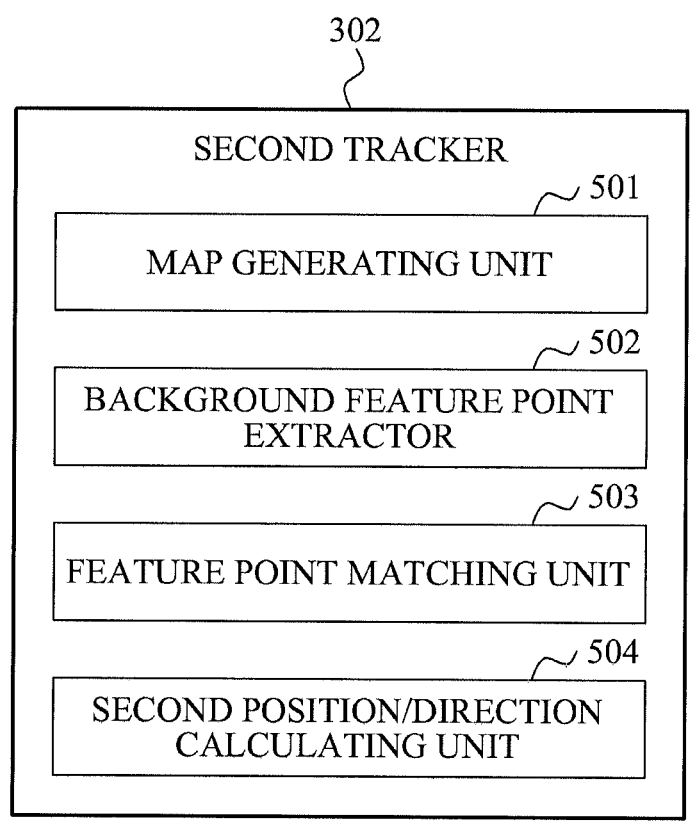
FIG. 5 illustrates a block diagram of a second tracker of FIG. 3.

FIG. 5 illustrates a block diagram of the second tracker 302 of FIG. 3.

Referring to FIG. 5, the second tracker 302 may include a map generating unit 501, a background feature point extractor 502, a feature point matching unit 503, and a second position/direction calculating unit 504.

The map generating unit 501 may generate a map using a feature point extracted from a region of the image frame obtained by excluding the extracted boundary of the target object.

The background feature point extractor 502 may extract a feature point from the background in the image frame.

The feature point matching unit 503 may match a feature point of the map to the feature point extracted from the background.

The second position/direction calculating unit 504 may calculate a position and a direction of the second virtual object that corresponds to the background, based on the matched feature points. Specifically, the second position/direction calculating unit 504 may calculate a position and a direction of a camera in a current scene where the feature points are matched, and may calculate the position and the direction of the second virtual object.

As a result, according to example embodiments, the target object and the background may be separated in different layers in the image frame, and the position and the direction of the first virtual object and the position and the direction of the second virtual object may be calculated in different coordinate systems. Thus, the first virtual object and the second virtual object may move independently.

Figure 6:
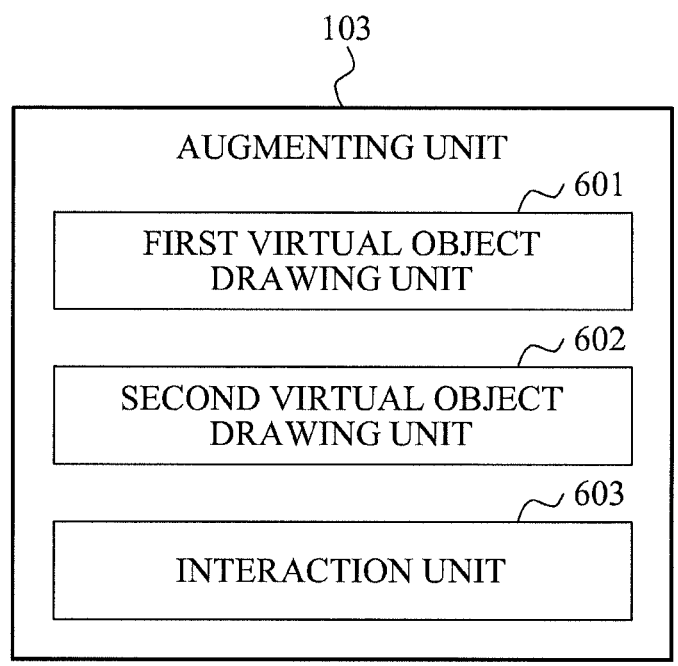
FIG. 6 illustrates a block diagram of an augmenting unit of FIG. 1.

FIG. 6 illustrates a block diagram of the augmenting unit 103 of FIG. 1.

Referring to FIG. 6, the augmenting unit 103 may include a first virtual object drawing unit 601, a second virtual object drawing unit 602, and an interaction unit 603.

The first virtual object drawing unit 601 may draw the first virtual object corresponding to the target object, based on a position and a direction of the first virtual object. The first virtual object drawing unit 601 may draw the first virtual object in the front portion of the target object. Additionally, when an occlusion occurs between the target object and the background, the first virtual object drawing unit 601 may draw the target object, prior to the background.

The second virtual object drawing unit 602 may draw the second virtual object corresponding to the background, based on a position and a direction of the second virtual object. Here, the second virtual object may be drawn based on the map generated by the map generating unit 501. The second virtual object drawing unit 602 may draw the second virtual object in the rear portion of the target object.

The interaction unit 603 may perform either an interaction between the first virtual object and the second virtual object, or an interaction between the first virtual object, the second virtual object and the target object.

Thus, the first virtual object and the second virtual object may be independently drawn based on different coordinate systems.

Figure 7:
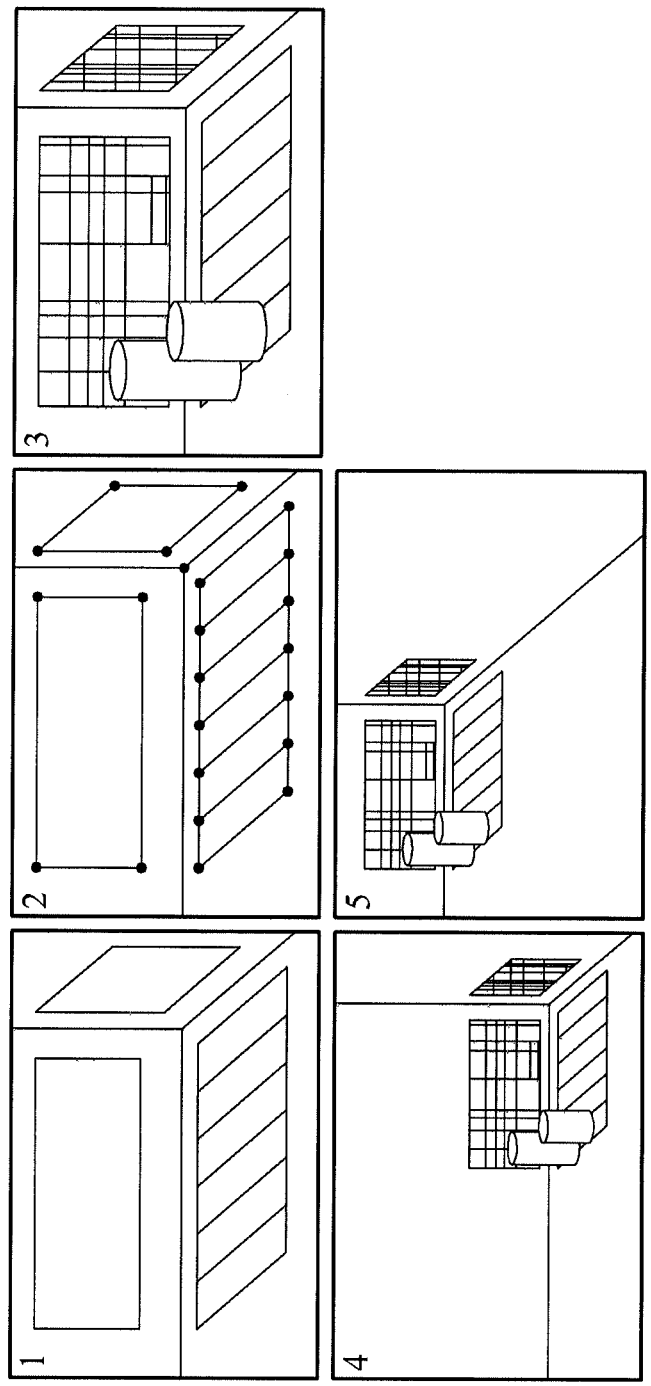
FIG. 7 illustrates a diagram of a visual simultaneous localization and mapping (SLAM)-based augmented reality.

FIG. 7 illustrates a diagram of a visual simultaneous localization and mapping (SLAM)-based augmented reality.

Referring to FIG. 7, the visual SLAM-based augmented reality may be implemented by the following operations:

In operation (1), an image frame including a background may be input.

In operation (2), a corner point, for example, available as a feature point may be extracted from a texture of the input image frame, and a map may be generated.

In operation (3), a virtual object may be augmented based on the generated map.

In operations (4) and (5), a position of the virtual object may be fixed due to a correlation between feature points forming the map, even when a viewpoint of a camera is changed.

The visual SLAM-based augmented reality may be advantageous in that a separate marker or model is not required. However, in the visual SLAM-based augmented reality, when robustness is relatively reduced and when feature points forming the map are covered due to an occlusion, it may not be possible to calculate a position of the camera inputting the image frame. Additionally, in the visual SLAM-based augmented reality, all virtual objects may exist in the same coordinate system, since positions of virtual objects augmented based on an arrangement pattern of feature points are determined.

Figure 8:
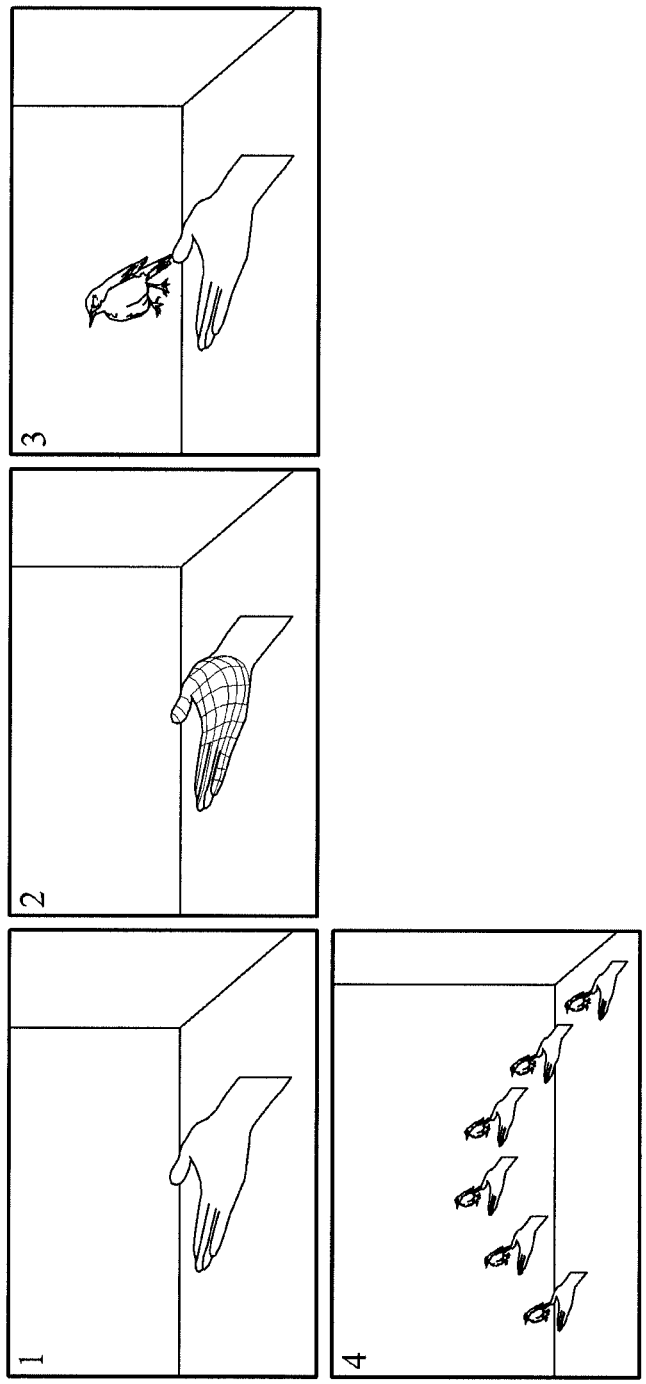
FIG. 8 illustrates a diagram of a model-based augmented reality.

FIG. 8 illustrates a diagram of a model-based augmented reality.

Referring to FIG. 8, the model-based augmented reality may be implemented by the following operations:

In operation (1), an image frame may be input.

In operation (2), a target object corresponding to a 3D model registered in a database may be searched for from the input image frame, and the found target object may be matched to the 3D model.

In operation (3), a virtual object may be augmented based on the target object matched to the 3D model.

In operation (4), the virtual object may be moved based on the target object by repeating operations (1) through (3) for each of image frames that are consecutively input.

It is advantageous that the model-based augmented reality may be robust to tracking a target object, and may enable an interaction to be performed so that a position of a virtual object may be changed by movement of the target object. However, in the model-based augmented reality, a 3D model needs to be stored in advance in order to match the 3D model to the target object, and it is more difficult to process the 3D model in real-time as the 3D model becomes complicated. Additionally, it is difficult to apply the model-based augmented reality, in a case of a wide range such as a background.

Figure 9:
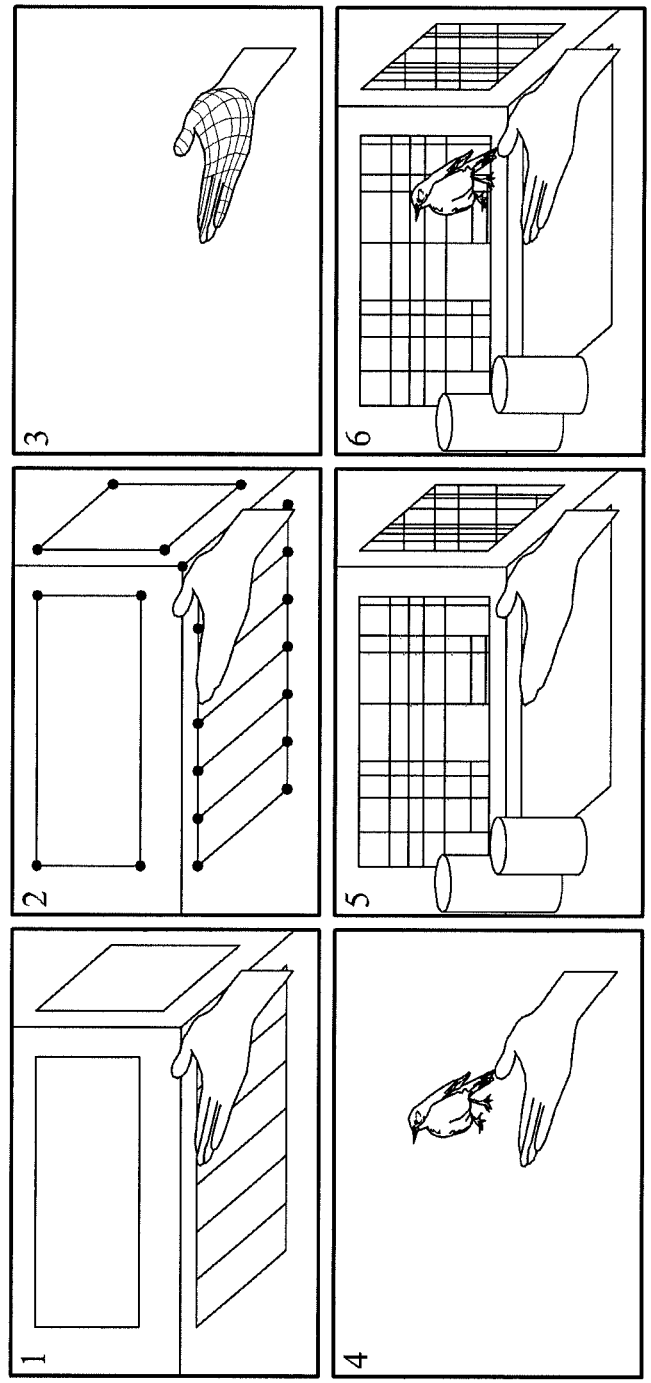
FIG. 9 illustrates a diagram of a multi-layered augmented reality according to example embodiments.

FIG. 9 illustrates a diagram of a multi-layered augmented reality according to example embodiments.

The multi-layered augmented reality of FIG. 9 may be configured by combining the model-based augmented reality and the visual SLAM-based augmented reality. That is, the model-based augmented reality may be applied to a target object, and the visual SLAM-based augmented reality may be applied to a background.

Referring to FIG. 9, a multi-layered augmented reality system according to example embodiments may perform the following operations:

In operation (1), an image frame may be input through a camera, for example.

In operation (2), a target object corresponding to a 3D model stored in a database may be searched for from the input image frame, and the found target object may be matched to the 3D model. A corner point, for example, available as a feature point may be extracted from a texture of a region of the image frame obtained by excluding a separated boundary of the target object, and a map may be generated.

In operation (3), a position and a direction of a virtual object may be calculated by accurately matching the target object to the 3D model.

In operation (4), the virtual object may be augmented based on the target object, using the calculated position and the calculated direction of the virtual object.

In operation (5), a virtual object may be augmented based on a background, using the map generated in operation (2).

In operation (6), the virtual object augmented in operation (4), and the virtual object augmented in operation (5) may be drawn together.

Thus, layers of the virtual objects may be separated into the target object and the background even in the same screen, and accordingly the virtual objects may have different coordinate systems. That is, the virtual object augmented based on the background, and the virtual object augmented based on the target object may independently move in different coordinate systems.

Therefore, when the virtual objects independently move, the target object, and the virtual object corresponding to the target object may freely interact with each other. Additionally, the virtual object corresponding to background may be augmented in the rear portion of the target object, and the virtual object corresponding to the target object may be augmented in the front portion of the target object and thus, it is possible to solve an occlusion problem.

The multi-layered augmented reality system may pass through the following processing operations.

When consecutive image frames are input, the multi-layered augmented reality system may search for, from a current image frame, a target object corresponding to a 3D model stored in a database. When the target object corresponding to the 3D model is found, the multi-layered augmented reality system may match the target object to the 3D model, and may estimate a position and a direction of a virtual object corresponding to the 3D model.

At the same time, the multi-layered augmented reality system may extract a feature point from the current image frame, based on a background obtained by excluding the target object to be tracked, and may generate a map. Subsequently, the multi-layered augmented reality system may calculate a position and a direction of a virtual object augmented based on the background. Additionally, the multi-layered augmented reality system may perform rendering by reflecting the position and the direction of the virtual object augmented based on the background, and a position and a direction of a virtual object augmented based on the target object. Here, the multi-layered augmented reality system may not augment the virtual object augmented based on the background in a boundary of the target object, because an occlusion is likely to occur.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A multi-layered augmented reality system, comprising: at least one computer comprising:
    an extracting unit to extract a target object and a background from an image frame;
    a tracking unit to track the extracted target object and the extracted background;
    an augmenting unit to augment a first virtual object corresponding to the tracked target object and a second virtual object corresponding to the tracked background; and
    a display unit to display the augmented virtual object, wherein the extracting unit comprises:
    an object recognizer to recognize the target object in the image frame;
    a boundary extractor to extract a boundary of the target object; and
    a feature point extractor to extract a feature point from a region of the image frame corresponding to the background, which is obtained by excluding a region of the image frame which includes a region of the image frame within the extracted boundary of the target object.

2. The multi-layered augmented reality system of claim 1, wherein the tracking unit comprises:
    a first tracker to track the first virtual object corresponding to the target object; and
    a second tracker to track the second virtual object corresponding to the background.

3. The multi-layered augmented reality system of claim 2, wherein the first tracker comprises:
    a model matching unit to match the target object to a three-dimensional (3D) model stored in a database; and
    a first position/direction calculating unit to calculate a position and a direction of the first virtual object, the first virtual object corresponding to the 3D model matched to the target object.

4. The multi-layered augmented reality system of claim 2, wherein the second tracker comprises:
    a map generating unit to generate a map using a feature point extracted from a region of the image frame obtained by excluding the extracted boundary of the target object;
    a background feature point extractor to extract a feature point from the background in the image frame;
    a feature point matching unit to match a feature point of the map to the feature point extracted from the background; and
    a second position/direction calculating unit to calculate a position and a direction of the second virtual object based on the matched feature points, the second virtual object corresponding to the background.

5. The multi-layered augmented reality system of claim 2, wherein the augmenting unit comprises:
    a first virtual object drawing unit to draw the first virtual object corresponding to the target object, based on a position and a direction of the first virtual object;
    a second virtual object drawing unit to draw the second virtual object corresponding to the background, based on a position and a direction of the second virtual object; and
    an interaction unit to perform either an interaction between the first virtual object and the second virtual object, or an interaction between the first virtual object, the second virtual object and the target object.

6. The multi-layered augmented reality system of claim 5, wherein the first virtual object drawing unit draws the first virtual object in a front portion of the target object, and wherein the second virtual object drawing unit draws the second virtual object in a rear portion of the target object.

7. The multi-layered augmented reality system of claim 2, wherein the first virtual object and the second virtual object are independently drawn based on different coordinate systems.

8. A multi-layered augmented reality method, comprising:
    extracting, by a processor, a target object and a background from an image frame;
    tracking, by the processor, the extracted target object and the extracted background;
    augmenting, by the processor, a first virtual object corresponding to the tracked target object and a second virtual object corresponding to the tracked background; and
    displaying, by a display, the augmented virtual object, wherein the extracting comprises:
    recognizing the target object in the image frame;
    extracting a boundary of the target object; and
    extracting a feature point from a region of the image frame corresponding to the background, which is obtained by excluding a region of the image frame which includes a region of the image frame within the extracted boundary of the target object.

9. The multi-layered augmented reality method of claim 8, wherein the tracking comprises:
    tracking the first virtual object corresponding to the target object; and
    tracking the second virtual object corresponding to the background.

10. The multi-layered augmented reality method of claim 9, wherein the tracking of the first virtual object comprises:
    matching the target object to a three-dimensional (3D) model stored in a database; and
    calculating a position and a direction of the first virtual object, the first virtual object corresponding to the 3D model matched to the target object.

11. The multi-layered augmented reality method of claim 9, wherein the tracking of the second virtual object comprises:
    generating a map using a feature point extracted from a region of the image frame obtained by excluding the extracted boundary of the target object;
    extracting a feature point from the background in the image frame;

matching a feature point of the map to the feature point extracted from the background; and calculating a position and a direction of the second virtual object based on the matched feature points, the second virtual object corresponding to the background.

12. The multi-layered augmented reality method of claim 9, wherein the augmenting comprises:

drawing the first virtual object corresponding to the target object, based on a position and a direction of the first virtual object;

drawing the second virtual object corresponding to the background, based on a position and a direction of the second virtual object; and performing either an interaction between the first virtual object and the second virtual object, or an interaction between the first virtual object, the second virtual object and the target object.

13. The multi-layered augmented reality method of claim 12, wherein the drawing of the first virtual object comprises drawing the first virtual object in a front portion of the target object, and wherein the drawing of the second virtual object comprises drawing the second virtual object in a rear portion of the target object.

14. The multi-layered augmented reality method of claim 9, wherein the first virtual object and the second virtual object are independently drawn based on different coordinate systems.

15. A multi-layered augmented reality method, comprising:

extracting, by a processor, a target object and a background from an image frame;

tracking, by the processor, the extracted target object and the extracted background;

applying, by the processor, different coordinate systems to a first virtual object corresponding to the target object, and a second virtual object corresponding to the background; and drawing, by the processor, the first virtual object based on the target object, and drawing the second virtual object based on the background.

16. The multi-layered augmented reality method of claim 15, wherein the drawing comprises drawing the target object prior to the background when an occlusion occurs between the target object and the background.

17. A non-transitory computer readable recording medium storing a program to cause a computer to implement the method of claim 8.

18. A computer system comprising:

an input device to input an image frame;

a multi-layered augmented reality system, comprising:

an extracting unit to extract a target object and a background from the image frame, a tracking unit to track the extracted target object and the extracted background by applying different coordinate systems to the extracted target object and the extracted background object, and an augmenting unit to augment a virtual object corresponding to each of the tracked target object and the tracked background; and a display unit to display the augmented virtual object.

19. The computer system of claim 18, wherein the tracking unit comprising:

a first tracker to apply a first coordinate system to the extracted target object, and a second tracker to apply a second coordinate system to the extracted background object.

20. The computer system of claim 19, wherein:

the first tracker matches the extracted target object to a three-dimensional (3D) model stored in a database and calculates a position and a direction of a camera associated with a first virtual object corresponding to the three-dimensional (3D) model, and the second tracker matches a feature point of the map to the feature point extracted from the background and calculates a position and a direction of a second virtual object corresponding to the extracted background object, based upon matched feature points.

21. A method of a multi-layered augmented reality system, comprising:

inputting, by a camera, an image frame;

searching, by a processor, for a target object from the input image frame and matching the target object to a corresponding to a 3D model stored in a database;

extracting, by the processor, a feature point from a texture of a region of the input image frame obtained by excluding a separated boundary of the target object and generating a map;

calculating, by the processor, a position and a direction of a first virtual object by matching the target object to the 3D model;

augmenting, by the processor, the first virtual object based on the target object by using the calculated position and the calculated direction of the first virtual object;

augmenting a second virtual object based on a background, using the generated map; and drawing together, by the processor, the first augmented virtual object and the second augmented virtual object.

22. The method of claim 21, further comprising:

displaying, by a display, the drawn together first augmented virtual object and the second augmented virtual object.

23. The method of claim 22, wherein layers of the first virtual object and the second virtual object are separated into the target object and the background on the display, the first virtual object and the second virtual object have different coordinate systems, and the first augmented virtual object and the second augmented virtual object independently move in the different coordinate systems.

* * * * *